(12) United States Patent
Bull et al.

(10) Patent No.: US 8,365,775 B2
(45) Date of Patent: Feb. 5, 2013

(54) CONCENTRIC, INSULATED TUBULAR CONDUITS AND METHOD FOR ASSEMBLY

(75) Inventors: Layton R. Bull, Houma, LA (US); Douglas J. Trosclair, Chauvin, LA (US); Terron A. Adams, Lockport, LA (US); Roy J. Blanchard, Houma, LA (US)

(73) Assignee: V&M Tube-Alloy, L.P., Houston, TX (US)

( * ) Notice: Subject to any disclaimer, the term of this patent is extended or adjusted under 35 U.S.C. 154(b) by 528 days.

(21) Appl. No.: 11/361,760

(22) Filed: Feb. 24, 2006

(65) Prior Publication Data
US 2006/0208031 A1    Sep. 21, 2006

Related U.S. Application Data

(60) Continuation of application No. 10/357,611, filed on Feb. 4, 2003, now abandoned, which is a division of application No. 09/912,053, filed on Jul. 23, 2001, now Pat. No. 6,520,732, which is a division of application No. 09/481,619, filed on Jan. 12, 2000, now Pat. No. 6,325,278.

(51) Int. Cl.
*F16L 9/18*    (2006.01)
(52) U.S. Cl. .................... 138/112; 138/113; 138/148
(58) Field of Classification Search ........... 138/108, 138/112, 113, 148
See application file for complete search history.

(56) References Cited

U.S. PATENT DOCUMENTS

| | | | | |
|---|---|---|---|---|
| 2,041,911 A | * | 5/1936 | Ericson | 138/178 |
| 2,512,116 A | * | 6/1950 | Siebels | 138/113 |
| 2,706,495 A | * | 4/1955 | Risley | 138/148 |
| 2,714,395 A | * | 8/1955 | Epstein | 138/113 |
| 2,914,090 A | * | 11/1959 | Isenberg | 138/113 |
| 3,126,918 A | * | 3/1964 | Eaton | 138/113 |
| 3,213,889 A | * | 10/1965 | Cotman, Jr. | 138/113 |
| 3,619,474 A | * | 11/1971 | Beck | 174/19 |
| 3,875,530 A | * | 4/1975 | Manoukian | 372/65 |
| 4,033,381 A | * | 7/1977 | Newman et al. | 138/113 |
| 4,036,617 A | * | 7/1977 | Leonard et al. | 62/50.7 |
| 4,233,816 A | * | 11/1980 | Hensley | 62/50.7 |
| 4,460,540 A | * | 7/1984 | Funk et al. | 376/327 |
| 4,531,552 A | * | 7/1985 | Kim | 138/149 |

(Continued)

FOREIGN PATENT DOCUMENTS
WO    WO 97/01017    *    1/1997

*Primary Examiner* — James Hook
(74) *Attorney, Agent, or Firm* — Bushman & Associates, P.C.

(57) ABSTRACT

Concentric, tubular sections are assembled by first securing annular centralizers and insulation about the external surface of the smaller diameter tube while the tube is horizontally disposed. The larger tube is then vertically aligned and lowered into a recessed area formed below the assembly area work level. A lifting cable, secured at one end to a lifting device, is extended through the smaller diameter tube and attached to a hoisting arrangement that vertically orients the tube concentrically over the larger diameter tube. Spring-loaded legs on the lifting device are manually retracted radially to permit the smaller tube to be lowered concentrically through the larger tube. The inner tube is lowered until the legs spring radially outwardly to engage the base of the larger tube. The entire assembly may then be lifted as a unit by the hoist with the lifting device, establishing the axial positions of the two tubes relative to each other. The centralizers closely engage the internal surface of the larger tube to centralize the inner tube and to prevent relative radial movement between the tubes. The external surface of the centralizers is specially configured to provide an interrupted line contact with the external tube, and the centralizers are rotated relative to each other to circumferentially displace points of contact with the external tube to minimize heat transfer.

5 Claims, 5 Drawing Sheets

U.S. PATENT DOCUMENTS

| | | | | |
|---|---|---|---|---|
| 4,724,750 | A | * | 2/1988 | Coleman et al. .................. 454/47 |
| 4,896,701 | A | * | 1/1990 | Young ............................ 138/108 |
| 5,018,260 | A | * | 5/1991 | Ziu ................................... 24/555 |
| 5,277,242 | A | * | 1/1994 | Arrington ...................... 164/298 |
| 5,503,192 | A | * | 4/1996 | Platusich et al. ............... 138/113 |
| 5,592,975 | A | * | 1/1997 | Wissmann et al. ............ 138/112 |
| 5,902,656 | A | * | 5/1999 | Hwang ....................... 428/36.91 |
| 6,015,015 | A | * | 1/2000 | Luft et al. ..................... 166/384 |
| 6,562,401 | B2 | * | 5/2003 | Eaton ............................ 427/195 |
| 2003/0056844 | A1 | * | 3/2003 | Gauthier et al. ............... 138/108 |
| 2006/0237084 | A1 | * | 10/2006 | Hoffmann ..................... 138/112 |

* cited by examiner

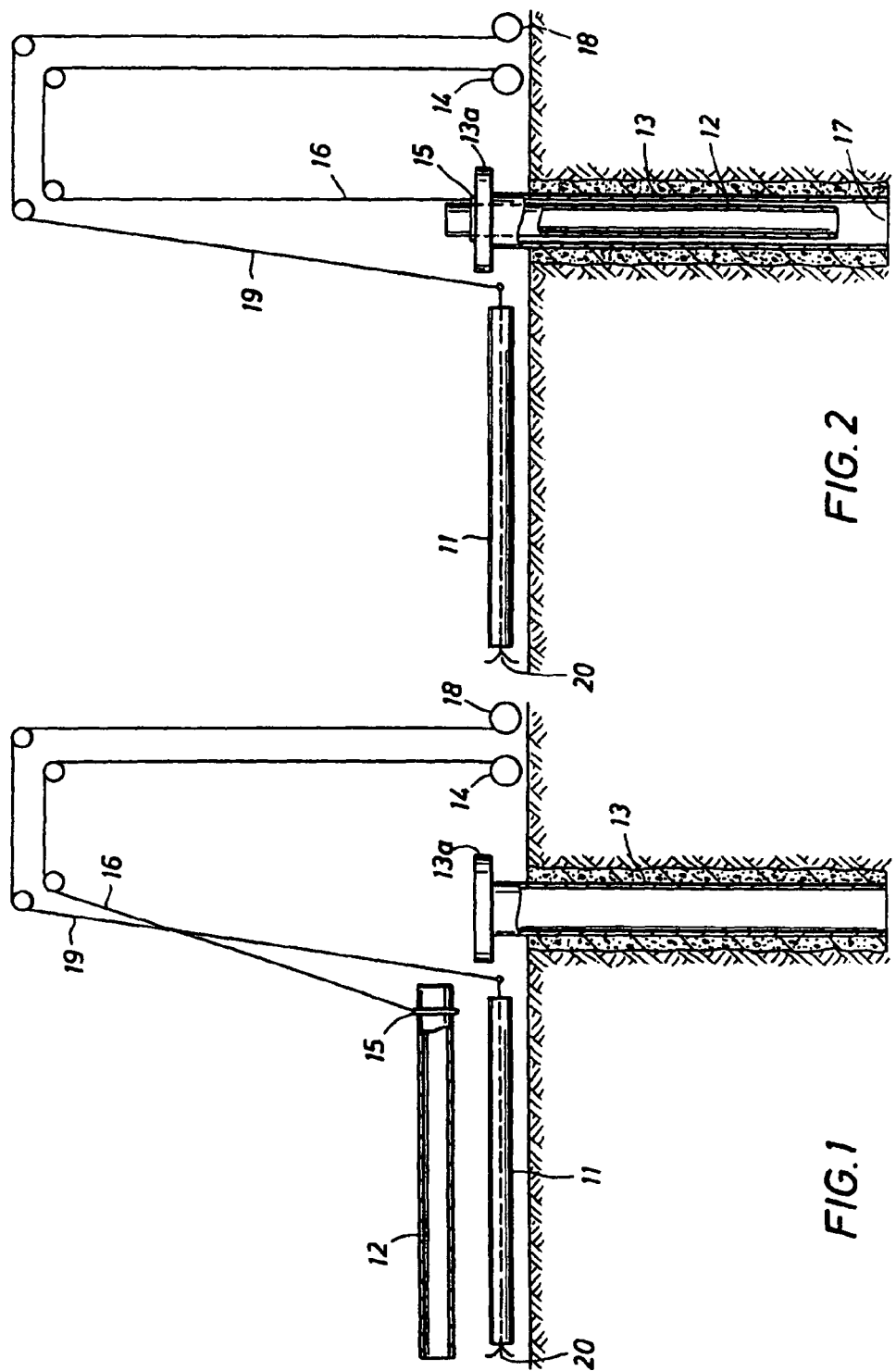

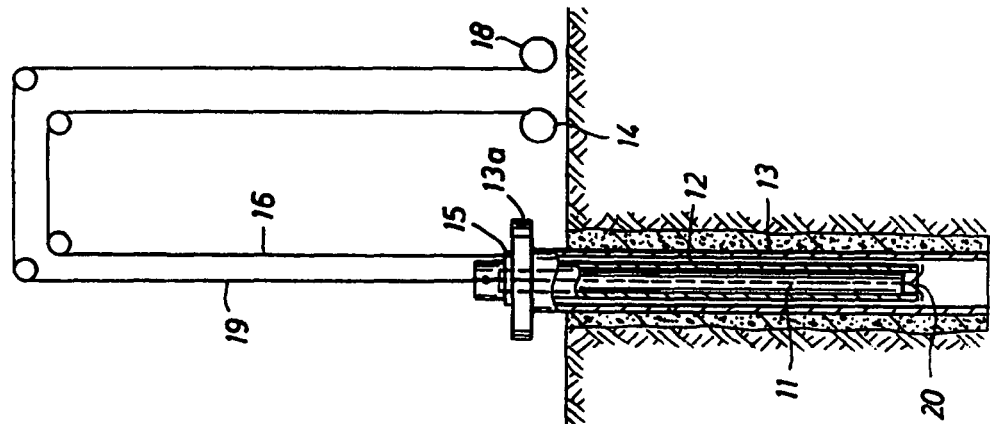
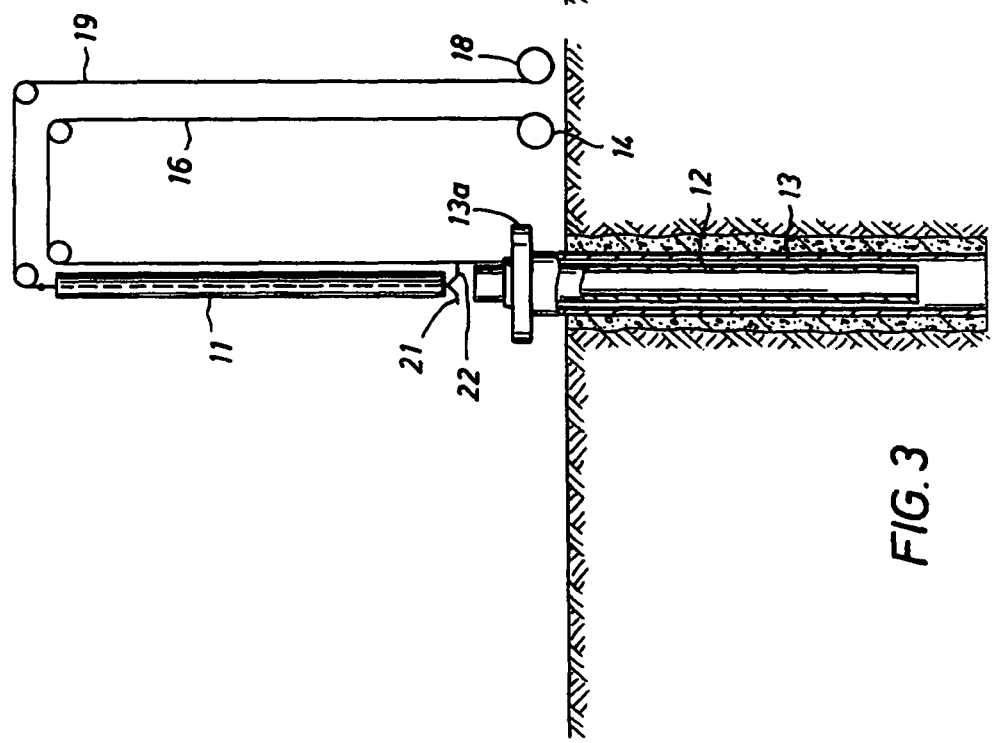

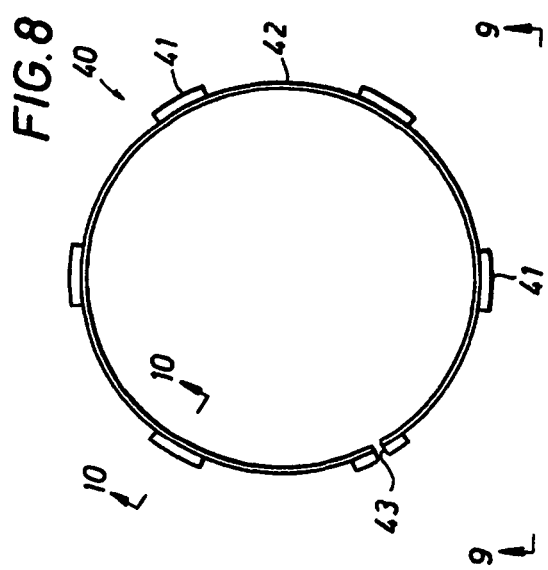
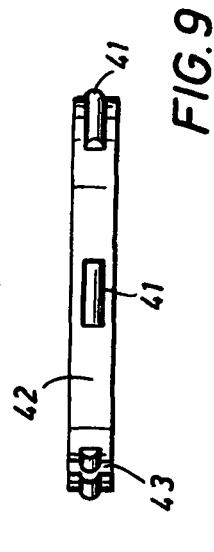
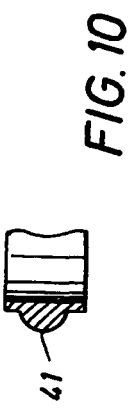
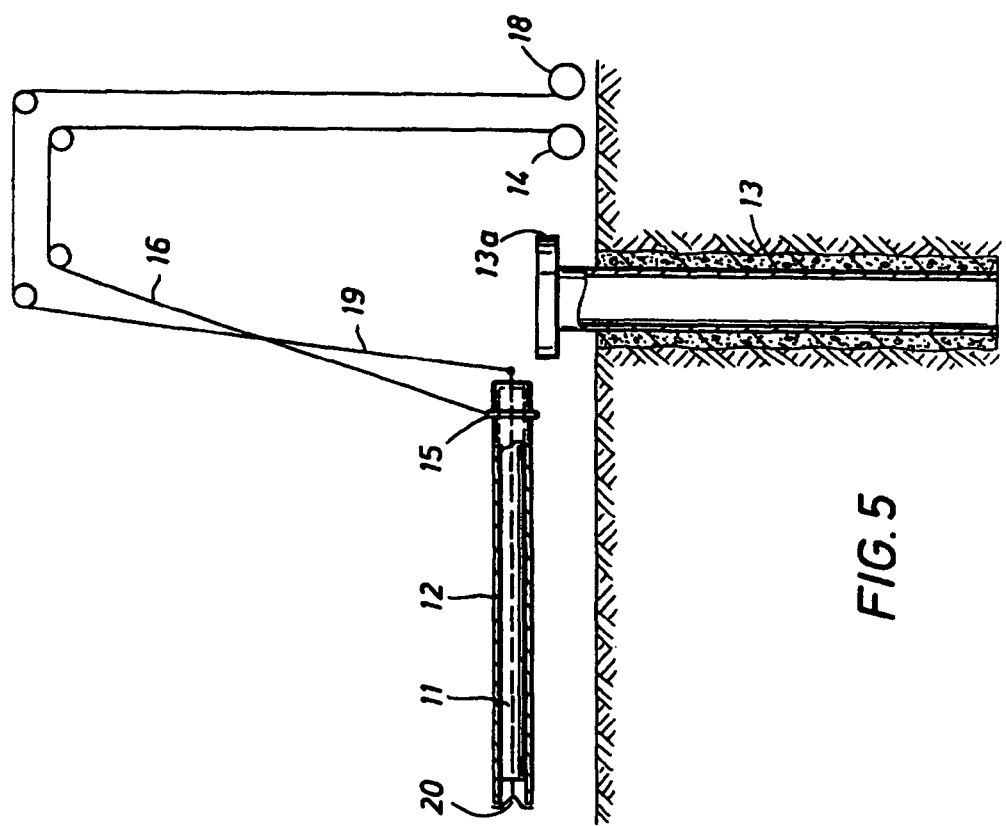

CONCENTRIC, INSULATED TUBULAR CONDUITS AND METHOD FOR ASSEMBLY

CROSS REFERENCE TO RELATED APPLICATIONS

This application is a continuation of U.S. patent application Ser. No. 10/357,611 filed Feb. 4, 2003 now abandoned which is a divisional of U.S. patent application Ser. No. 09/912,053 filed Jul. 23, 2001 now U.S. Pat. No. 6,520,732 which is a divisional of U.S. patent application Ser. No. 09/481,619 filed Jan. 12, 2000 now U.S. Pat. No. 6,325,278.

BACKGROUND OF THE INVENTION

1. Field of the Invention

The present invention relates to methods for fabricating insulated, concentric tubular bodies and the bodies fabricated by such methods. Insulated tubulars or pipe of this type are sometimes referred to as "pipe-in-pipe" or "tube-in-tube" fluid conduits. Insulated, concentric tubular fluid conduits are employed in well completions, pipelines, refineries, and other processing installations.

2. Prior Art Setting of the Invention

The tube-in-tube insulated pipe employed in oil and gas wells is typically joined together end-to-end by threaded connections. In the case of some of the designs employed in oil and gas wells, the threads must be formed on the tubing after the concentric pipe bodies have been assembled. The typical insulated section employs a threaded external tube surrounding a shorter, smaller diameter tube that is welded into the larger tube. The assembly may also be heat treated after the inner tube is installed. The threads are preferably formed on the outer tube after the inner tube is installed and the assembly is heat treated.

Conventional threading operations require that the pipe be rotated as threads are being cut into the end of the pipe. Threading speeds of 150 rpm or more are common. Relative movement between the inner and outer pipe bodies as the assembly is rotated can cause harsh vibration and other undesired mechanical movement that interferes with the threading process.

The relative radial position of the inner and outer tubes can be fixed by employing multiple rigid spacers in the annulus between the two tubes. One commonly employed technique is to provide a hinged metal stamping with raised ears to close the gap between the inner and outer tubes. Because of the use of sheet stock as the spacer material, the contacting ears form a flat surface engaging the inside surface of the surrounding tube.

Another technique employed to fix the inner and outer tubes is to employ a square stock that has been cut to short lengths and welded onto the outside surface of the inner pipe. Because the spacer is cut from square stock, the contact ends form a flat surface contacting the inside surface of the inner pipe.

In both of the described prior art spacing techniques, the design and volume of these spacers can significantly increase the heat transfer between the inner and outer conductors. Benefits of a more stable assembly for threading purposes are offset by the increases in heat transfer between the tubes.

The shape, size, and distribution of the centralizers also affect the assembly process of inserting the inner tube into the outer tube. Multilayer wrappings of insulating material are often disposed over the smaller diameter tube between the axially spaced centralizers. It is typical to insert the inner tube, equipped with centralizers and insulation material, into the larger tube while the inner and outer tubes are horizontally oriented. As this is done, the inner tube slides along the internal bottom wall of the outer tube. This sliding movement can damage the centralizers and the insulation material. Horizontal insertion may also be made difficult when the internal surface of the outer tubular body is coarse or irregular such that the centralizers and insulation are abraded or hang up on the surface irregularities.

Many of the problems associated with horizontal assembly of the inner and outer tubes may be avoided by orienting the two tubes vertically while the inner tube is inserted. While the vertical orientation technique can eliminate the described problems associated with dragging the inner tube along the internal bottom wall of the outer tube, vertical orientation introduces other assembly problems. In this regard, the relative axial position of the inner and outer tubular bodies must be closely controlled such that the mid-length of each conduit is coincident. Additionally, the inner tubular body is usually shorter than the surrounding outer body so that the lengthwise centering must be accomplished within the surrounding pipe.

The desired spacing could be achieved by welding temporary lugs or retaining members to the inner or outer pipe at appropriate locations to form a stop that would fix the inner pipe lengthwise within the outer pipe. Such a procedure would require an additional welding step and also introduces an additional point for the introduction of measurement errors.

SUMMARY OF THE INVENTION

Centralizing rings having specially configured contact surfaces are affixed to the external surface of the inner tube forming the concentric insulated tubular assembly. The centralizers are provided with a curving cross-section along their radially outermost contact surface to make circumferential line contact with the internal surface of the overlying tubular body to minimize heat transfer between the tubes.

Recesses are formed circumferentially about the external diameter of the centralizing rings to minimize the total contact area between the rings and the surrounding tubing. The centralizing rings are disposed circumferentially about the inner tube such that the recesses in adjacent centralizing rings are offset circumferentially to preclude axially extending, aligned contact surfaces that enhance heat transfer.

The centralizing rings provide a minimum amount of surface contact with the overlying tube while rigidly occupying the annular space formed between the inner and outer tubular bodies to prevent any relative radial displacement between the bodies. The firm line contact engagement provided by the centralizing rings minimizes the heat transfer between the inner and outer tubes and also permits the concentric tubular assembly to be rotated at high speeds during the threading process without experiencing excessive vibration or other undesired mechanical movement.

The damage normally occurring when insulating tubes are assembled horizontally is avoided with the use of a lifting device of the present invention that permits the inner and outer tubes to be assembled vertically in a recessed assembly well, the lifting device permits the inner tube to be raised vertically and aligned concentrically with the vertically disposed outer tube. The lifting device employed to lower the centralizer-equipped, insulation-wrapped inner tube vertically into the outer tube automatically centers the inner tube within the surrounding outer tube. Spring-loaded legs carried by the lifting device automatically spring radially outwardly once they clear the bottom of the larger diameter tubing. An upward pull exerted on the lifting device brings detents in the legs against the base of the outer tube so that the outer tube is supported by the lifting device and the inner and outer tubes are precisely positioned axially. The combined assembly may then be raised vertically from the assembly well and returned to horizontal position for subsequent working.

From the foregoing, it will be appreciated that an important object of the present invention is to provide a method and apparatus for assembling concentric tubular bodies whereby the bodies are rigidly affixed radially relative to each other to prevent vibration or other undesired motion as the bodies are rotated during the threading of the ends of the tubular bodies.

Yet another object of the present invention is to provide a centralizer ring that can be positioned in the annular space between concentric tubulars to securely fix the tubulars radially relative to each other while minimizing the amount of heat transfer between the tubulars.

Another object of the present invention is to provide a centralizing ring disposed in the annulus between two concentric tubular bodies wherein the centralizing ring forms an interrupted line contact with the surrounding tubular body to minimize the heat transfer between the two tubular bodies.

A related object of the present invention is to provide a curving surface on the external circumferential area of a centralizing ring whereby the ring forms a line contact with the inner surface of a surrounding tubular body.

An important object of the present invention is to provide a centralizing ring that may be employed in the vertical assembly of concentric tubular components whereby the radially outer surface of such centralizing ring engages the internal surface of the surrounding tubular and is configured to freely advance axially along such surface.

An important object of the present invention is to provide a lifting device that permits a tubular body equipped with annular centralizing rings to be lifted from a horizontal orientation, vertically oriented in a position coaxially with a larger tubular within which is to be received, lowered centrally through the larger tubular, and positioned axially at the correct axial location relative to the surrounding tubular. A related object of the present invention is to provide an annular shoulder and radial end surfaces on the lifting device whereby the lower end of the smaller tubular rests on the annular shoulder while the radial end surfaces centralize the smaller tubular as it is lowered through the larger tubular.

An object of the present invention is to provide a lifting device that can support an outer tubular body and an inner-tubular body and automatically position the two bodies axially relative to each other while the bodies are vertically oriented.

An object of the present invention is to provide a single assembly device for lowering a vertically oriented tubular through a larger surrounding tubular and subsequently raising both tubulars with a single lifting movement of the assembly device.

The foregoing, as well as other, objects, features, and advantages of the present invention will become more readily apparent and better understood from the following drawings, specification, and claims.

BRIEF DESCRIPTION OF THE DRAWINGS

FIG. 1 is a vertical elevation schematically illustrating the initial horizontal disposition of the individual tubular components of the insulated tubing of the present invention in the work area;

FIG. 2 is a vertical elevation schematically illustrating the repositioning of the larger tubular body from horizontal to vertical orientation in the assembly of the insulated tubing of the present invention;

FIG. 3 is a vertical elevation schematically illustrating the vertical alignment of the larger and smaller tubing components of the assembly just prior to inserting the smaller tubular body into the larger tubular body;

FIG. 4 is a vertical elevation schematically illustrating the two tubular bodies concentrically disposed in an assembly recess;

FIG. 5 is a vertical elevation schematically illustrating the assembled insulated tubing bodies removed from the assembly recess and repositioned horizontally in the work area;

FIG. 8 is a plan view of a centralizing ring of the present invention;

FIG. 9 is an elevation taken along the line 9-9 of FIG. 8 illustrating an annular centralizer of the present invention;

FIG. 10 is a vertical cross-section taken along the line 10-10 of FIG. 8 illustrating details in the configuration of the centralizing ring of the present invention.

DESCRIPTION OF THE ILLUSTRATED EMBODIMENTS

Figure 6:
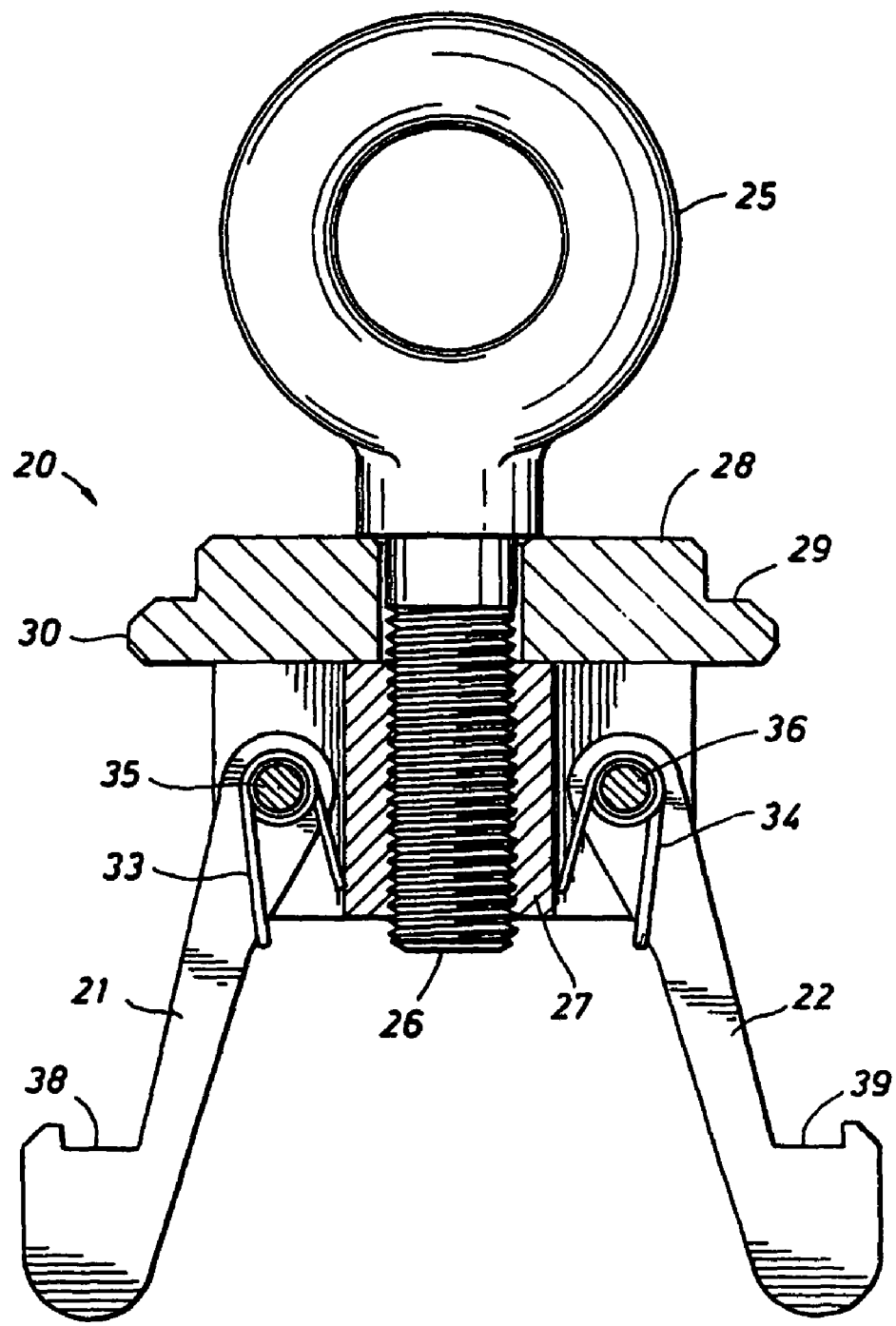
FIG. 6 is a vertical elevation, partially in section, illustrating a lifting device of the present invention.

FIG. 1 illustrates an assembly procedure employed in manufacturing the insulated tubing of the present invention. The process requires that an insulated tubular body 11 be inserted into a longer, larger diameter tubular body 12 to form a double-wall, concentric composite body. It is conventional in prior art processes to assemble the insulated tubing by inserting the smaller tube into the larger tube while both tubes are reclining horizontally as illustrated in FIG. 1. This procedure can damage the centralizing rings and insulating material carried around the external body of the inner tube. Interior surface projections and coarse finishes on the internal wall of the outer tube may also hang up with the centralizing rings and insulation material to prevent the inner tube from being freely received within the larger surrounding tube.

In practicing the assembly process of the present invention, the larger tubular body 12 is first elevated from its horizontal position in the work area and aligned vertically over a recessed assembly well 13. The work area may comprise a shop floor or an elevated table surface upon which the tubular bodies are initially positioned prior to being assembled.

A vertical hoist mechanism 14 is employed for lifting the tubular body 12 from its horizontal position in the work area into vertical alignment with the assembly well 13. The tube 12 is lifted by first securing a suitable clamp 15 about the external surface of the outer body 12. The clamp 15 is attached to a lift line 16 connecting with the hoisting mechanism 14. The vertically oriented tube 12 is lowered into the assembly well 13 and anchored in place in a chuck 13a or other suitable device to support the tube 12 vertically above the bottom 17 of the assembly well.

The inner tube 11, which has been previously equipped with centralizers and insulating material, as will hereinafter be described, is then lifted with a hoisting mechanism 18 from its horizontal position in the work area into a vertically aligned position above the tube 12 as illustrated in FIG. 3. In preparation for this hoisting procedure, a line 19 from the hoist 18 is threaded through the tube 11 and secured to a lifting device 20, as will hereinafter be more fully described. As the tube 11 is moved into a vertical position, the lifting device 20 engages the base of the tube to hold the tube in place on the hoist line 19.

The lifting device 20 carries spring-loaded legs 21 and 22 that are manually retracted before the lifting device engages the top of the tube 12, allowing the lifting device to be received within the larger tube as the smaller tube 11 is lowered vertically. The line 19 from the hoist 18 is reeled out until the spring-loaded legs 21 and 22 at the bottom of the tube 11 have been lowered sufficiently to clear the bottom of the tube 12. Once clear of the bottom of the tube 12, the legs 21 and 22 spring radially outwardly, as illustrated in FIG. 4.

Subsequent reeling in of the line 19 draws the extended legs 21 and 22 against the base of the tube 12 so that the lifting force of the hoist is transferred to the base of the tube 12. Continued retraction of the line 19 extracts the combined assembly of inner tube 11 and outer tube 12 from the assembly well 13. The concentric tubular assembly may then be returned to its horizontal position in the work area, as illustrated in FIG. 5.

FIG. 6 illustrates details in the construction and operation of the lifting device indicated generally at 20. The lifting device 20 employs a support structure in the form of a lifting eye 25 with a threaded shank 26 engaging an internally threaded nut member 27. A circular lift plate 28 is clamped in place between the nut 27 and the base of the body of the lifting eye 25. An annular lip 29 on the lift plate 28 provides a lift surface or support base for the lower axial end of the tube 11. The radially outer, circumferential end 30 of the lift plate 28 is dimensioned to closely clear the internal surface of the surrounding tube 12 to assist in centralizing the tube 11 as it is lowered into the larger outer tube. In one embodiment of the invention, the design clearance between radial end surface 30 and the internal wall of the surrounding tube 12 is approximately 0.030 inch.

The legs 21 and 22 are spring-biased to extend radially outwardly beyond the lateral limits of the radial end 30 of the lifting device 20. The spring bias force is provided by springs 33 and 34 that are mounted about the pivot points 35 and 36 of their respective legs in the manner illustrated in FIG. 6. As will be understood, radial inward movement of the legs 21 and 22 toward each other is resisted by the resilient force exerted by the springs 33 and 34, respectively. Detents 38 and 39 are provided at the external surfaces along the base of the legs 21 and 22. The detents 38 and 39 engage the base of the outer tubular body once the legs 21 and 22 spring outwardly after having cleared the bottom of the outer tube 12.

Figure 7:
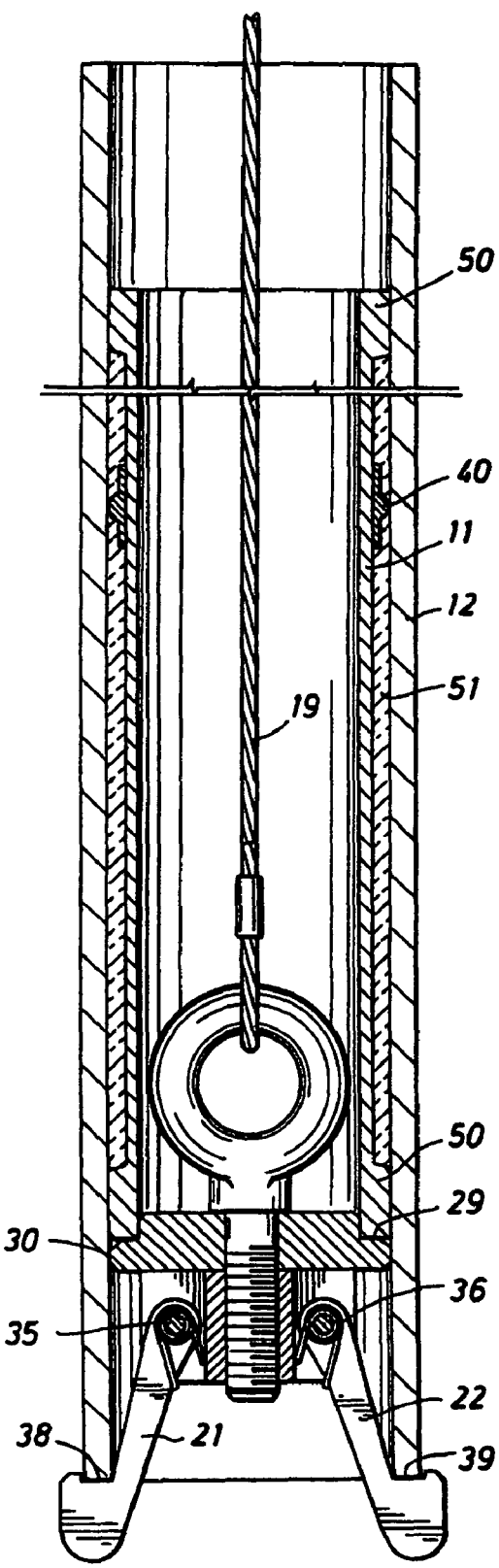
FIG. 7 is a vertical elevation, partially in section, illustrating a lifting device of the present invention engaging the bases of concentric inner and outer tubular bodies as the assembled bodies are being lifted from the assembly recess.

FIG. 7 illustrates the lifting device 20 secured to the bottom of the inner tube 11 and the outer tube 12 in preparation for extracting the assembly from the assembly well. The axial end or base of the tube 12 is seen to be supported by a lift surface in the form of detents 38 and 39, providing support for the outer tube 12. The lift plate 28 is illustrated supporting the base of the inner tube 11 on the annular lip 29. The circumferential end surface 30 provides a centralizing radially outer surface dimensioned to closely engage the internal wall of the surrounding tube 12 to ensure centralization of the tube 11.

As may best be seen by joint reference to FIGS. 7 through 11, the insulated tube of the present invention includes annular centralizing rings 40 that are secured along the external surface of the tube 11 to maintain proper spacing between the inner and outer tubes. Alternating projections 41 and radially recessed areas 42 formed along the external surface of the centralizing ring 40 provide structural support with a minimum amount of surface contact to minimize heat transfer while maintaining adequate structural support between the two tubes. A gap 43 is provided in the centralizing ring to assist in positioning the ring about the inner tube 11.

As may be seen by reference to the cross-section in FIG. 10, the ring 40 is provided with a curving external surface contour on the projections 41 to provide a line contact between the centralizing ring and the internal surface of the surrounding tube 12. In one embodiment of the invention, a design clearance of approximately 0.030 inch is provided between the outside diameter of the centralizing ring and the internal diameter of the surrounding tube 12. When the centralizing rings are assembled on the inner tube, the projections 41 are displaced circumferentially relative to similar projections on adjacent centralizing rings to reduce heat transfer between the two tubes.

The centralizing rings and insulating material are applied to the inner tube 11 while the tube is horizontally oriented in the work area, as illustrated in FIG. 1. The centralizing rings are positioned at axially spaced locations along the length of the tube 11 and are welded to the tube 11 at the desired axial positions. In one embodiment of the invention, three such centralizing rings are disposed intermediate the ends of the tube 11.

The tube 11 is provided with annular upsets or radial projections 50 at each tube end to function as centralizers for the tube 11. The upsets 50 may also be provided by welding an annular ring or other suitable body to the end of the tube and machining the body down to the desired dimension.

Insulating material 51 is wrapped around the tube 11 between the centralizing rings 40 and the upsets 50 to a diameter slightly less than the outside diameter of the upsets and centralizing rings. The insulation in one embodiment is formed by wrapping alternating layers of aluminum foil and fiber cloth mesh. Getter material may also be included in the composition of the material applied to the external surface of the tube 11.

The tube 11, as thus equipped with insulation and centralizing rings, is precisely positioned at the desired location within the tube 12 by the operation of the lifting device 20. Thus, as may be seen in FIG. 7, the axial spacing between the detents 38 and 39 and the top of the lip 29 precisely limits the axial position of the inner tube 11 relative to the outer tube 12. The illustrated axial position is the desired final welding position for the two tubes.

Figure 11:
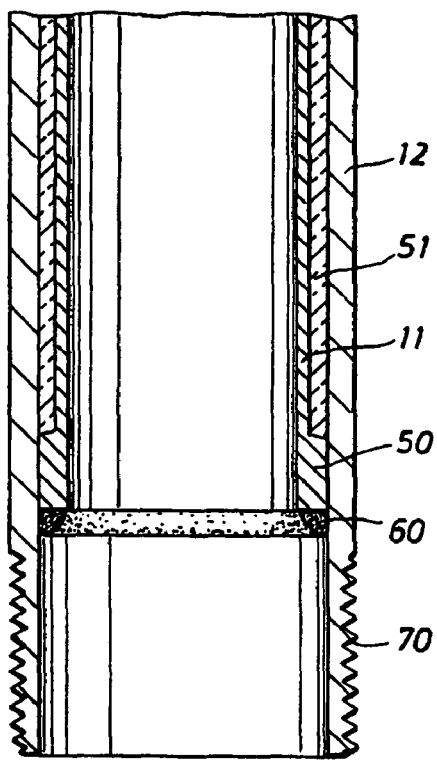
FIG. 11 is a vertical cross-section illustrating a completed insulated tubing assembly of the present invention.

As illustrated in FIG. 11, with the assembly disposed horizontally in the work area, the lifting device and line 19 are removed, and the upsets 50 are welded, as indicated at 60, to the internal surface of the tube 12. Welding seals the annular area between the tubes 11 and 12 to enhance the insulation effect of the assembly. After the inner tube 11 is welded in place, the assembly of tubes 11 and 12, insulation 51, and centralizing rings 40 is heat treated, and threads 70 are machined onto each end of the tube 12. As will be appreciated, the threading is performed after all of the handling, welding, and heat treating are completed to eliminate damage and distortion of the threaded area that would otherwise be caused by these fabrication procedures.

While a preferred form of the present invention has been described in detail with respect to the illustrated embodiments, it will be understood that various additions, changes, and variations in the construction and operation of the present invention may be made without departing from the spirit and scope of the invention, which is more broadly defined in the following claims.

The invention claimed is:

1. An insulated tubing assembly comprising:
a first, metallic outer tubular body having an inner cylindrical surface,
a second, metallic inner tubular body having an outer cylindrical surface and a layer of insulating material applied to said outer cylindrical surface, said first and second tubular bodies being substantially coaxial and forming an annulus therebetween; said first and second tubular bodies being of a type employed in oil and gas well operations, one of said first and second tubular bodies having first and second ends comprising a threaded connection; and
at least one, monolithic metallic centralizing ring disposed in said annulus between said first and second tubular bodies and welded to said outer cylindrical surface of said inner tubular body, said centralizing ring comprising a ring body, said ring body including a circumferential gap whereby said ring body can be diametrically expanded for assembly onto said inner tubular body, said ring body having an annularly extending, radially outwardly facing surface and an annularly extending, radially inwardly facing substantially cylindrical surface, and a plurality of circumferentially spaced, projections extending laterally outwardly from one of said radially outwardly or radially inwardly facing surfaces, said projections being curved in both an axial and radial direction, for forming a line contact in a single radial plane transverse and passing through an axis concentric with said first and second tubular bodies, with one of said inner or outer cylindrical surfaces, depending on whether said projections are on said radially outwardly facing surface or said radially inwardly facing surface to minimize heat loss from said inner tubular member.

2. The assembly of claim 1 wherein said projections extend laterally outwardly from said radially outwardly facing surface and said ring body is secured to said inner tubular body by welding.

3. An insulated tubing assembly comprising:
a first, metallic outer tubular body having an inner cylindrical surface;
a second, metallic inner tubular body having an outer cylindrical surface and a layer of insulating material applied to said outer cylindrical surface, said first and second tubular bodies being substantially coaxial and forming an annulus therebetween, said first and second tubular bodies being of a type employed in oil and gas well operations, one of said first and second tubular bodies having first and second ends comprising a threaded connection; and
at least one, metallic centralizing ring disposed in said annulus between said first and second tubular bodies and welded to said outer cylindrical surface of said inner body, said centralizing ring comprising a monolithic ring body, said ring body having an annularly extending, radially outwardly facing surface and an annularly extending, radially inwardly facing surface, and a plurality of circumferentially spaced, projections extending laterally outwardly from said radially outwardly facing surface, said projections having outermost surfaces, said outermost surfaces being curved in both an axial and radial direction, for forming a line contact in a single radial plane transverse and passing through an axis concentric with said first and second tubular bodies with said inner cylindrical surface to minimize heat loss from said inner tubular member.

4. The assembly of any one of claims 1 or 3, wherein there are a plurality of said rings and said projections on one of said rings are circumferentially offset from projections on an adjacent ring.

5. The assembly of claim 3, wherein said ring includes a circumferential gap whereby said ring can be diametrically expanded for assembly onto said inner tubular body prior to welding to said inner tubular body.

* * * * *